United States Patent [19]

Ozaki et al.

[11] Patent Number: 5,057,950
[45] Date of Patent: Oct. 15, 1991

[54] DATA STORAGE METHOD

[75] Inventors: Shinya Ozaki; Masaki Yamada, both of Tokyo, Japan; Brian A. Milthorp, Bristol, United Kingdom; Bruce A. Thompson, Fort Collins, Colo.

[73] Assignee: Hewlett-Packard Company, Palo Alto, Calif.

[21] Appl. No.: 295,174

[22] Filed: Jan. 6, 1989

[30] Foreign Application Priority Data

Jan. 8, 1988 [GB] United Kingdom ............... 8800353

[51] Int. Cl.$^5$ ..................... G11B 27/10; G11B 15/18; G11B 5/02
[52] U.S. Cl. ..................................... 360/72.2; 360/31
[58] Field of Search ................. 360/72.2, 72.1, 74.4, 360/74.5, 31

[56] References Cited

U.S. PATENT DOCUMENTS

| | | | |
|---|---|---|---|
| 3,947,877 | 3/1976 | Vittorelli | 360/48 |
| 4,360,842 | 11/1982 | Onishi et al. | 360/25 |
| 4,635,141 | 1/1987 | Coulter | 360/44 |
| 4,764,822 | 8/1988 | Taniguchi et al. | 360/72.2 X |
| 4,821,128 | 4/1989 | Inazawa et al. | 360/72.2 |

FOREIGN PATENT DOCUMENTS

A-87907 2/1982 European Pat. Off. .
59-129904 7/1984 Japan .
PCT 8505213 4/1985 PCT Int'l Appl. .

OTHER PUBLICATIONS

IEEE Transactions of Consumer Electronics, "A Fast Random Accessing Scheme for R-Dat", vol. CE-33, No. 3, Aug. 1987, pp. 275-284, left hand column, line 22-right hand column, line 36, FIGS. 1-4, (p. 275).

Primary Examiner—John H. Wolff

[57] ABSTRACT

Before reading/writing a newly loaded data tape, it is known to carry out read/write tests on the tape drive concerned by using a section of the tape set aside for this purpose. This test section is generally marked off by formatting keys which must be accessed and read to identify the test section. In order to facilitate access to the test section, the disclosed data storage method locates the test section in the region of tape between a beginning-of-media BOM position and a beginning-of-recording BOR position with the latter being at a known distance from BOM. As a result, it is possible to rely simply on displacement measurement to access the test section from BOM. As a precaution, a check can be made for possible overshoot error in the tape positioning means so as to avoid testing being carried out beyond BOR.

9 Claims, 6 Drawing Sheets

DATA STORAGE METHOD

BACKGROUND OF THE INVENTION

The present invention relates to a method of storing data on a recording tape.

Data is generally stored on tape interspersed with formatting keys that are subsequently used to facilitate access to the data. These keys may be pre-recorded on the tape or written to tape at the same time as the data.

It is known to carry out read/write tests on the tape drive upon loading of a tape and such tests are normally carried out in a region of the formatted section of the tape set aside for this purpose. Access to this test region therefore requires the drive to search for the appropriate formatting keys; this can take a significant amount of time.

SUMMARY OF THE INVENTION

According to the present invention, there is provided a method of storing data on a recording tape, the method involving writing data-to-stored downstream from a beginning-of-recording position (BOR) the location of which along the tape is determined in terms of displacement of the tape from a fully re-wound beginning-of-media position (BOM); the method further including a test phase of using a section of tape upstream of BOR or its expected location to carry out read and-/or write tests, this test section of tape being spaced from BOM and being accessed by displacement of the tape through a predetermined distance from BOM or a point on the tape where position relative to BOM is known.

By placing the test section outside the area of tape to which data is written it is possible to access the test section by relying on displacement of the tape through a predetermined distance without having to read formatting keys. Such access can be effected at high speed. The fact that the location of BOR is determined in terms of its displacement from BOM is important in that it means that the bounds of the unformatted area in which the test section can be placed are predetermined in terms of displacement and not by formatting keys. Although it is known to determine the location of BOR by displacement from BOM, this fact has not been used to the same particular advantages as in the present invention.

By the use of adequate guard bands, there is little risk of displacement errors resulting in the tests (which may include write tests) being carried out beyond BOR where valid data could be affected In certain applications, it may be advantageous, prior to carrying out the read/write tests to check for the possibility of a fault in the tape positioning means that would result in displacement overshoot sufficient to cause the tests to be carried in the data area. Advantageously, such a check is carried out by moving the tape from BOM to the region of BOR based on effecting a predetermined displacement by said positioning means, and determining any unacceptable overshoot by reading the tape for data written beyond BOR.

For a tape storage device in which a helical scan recording method is used to write data in oblique tracks, BOR is preferably constituted by the first track of a plurality of numbered tracks, whereby tape position relative to BOR, and thus possible overshoot, can be determined by reading the track number of a track.

BRIEF DESCRIPTION OF THE DRAWINGS

A data storage method and apparatus embodying the invention and for storing computer data on tape, will now be particularly described, by way of non-limiting example, with reference to the accompanying diagrammatic drawings, in which.

DETAILED DESCRIPTION OF THE PREFERRED EMBODIMENT

The data storage apparatus now to be described utilizes a helical scan technique for storing data in oblique tracks on a recording tape in a format similar to that used for the storage of PCM audio data according to the DAT Conference Standard (June 1987, Electronic Industries Association of Japan, Tokyo, Japan). The present apparatus is, however, adapted for storing computer data rather than digitised audio information.

Figure 1:
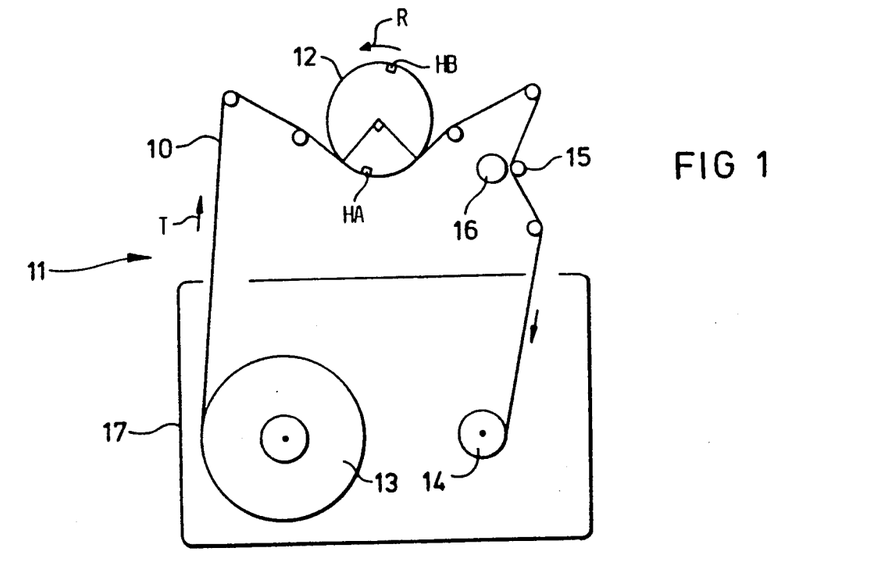
FIG. 1 is a diagram illustrating the main physical components of a tape deck employing helical scanning.
Figure 2:
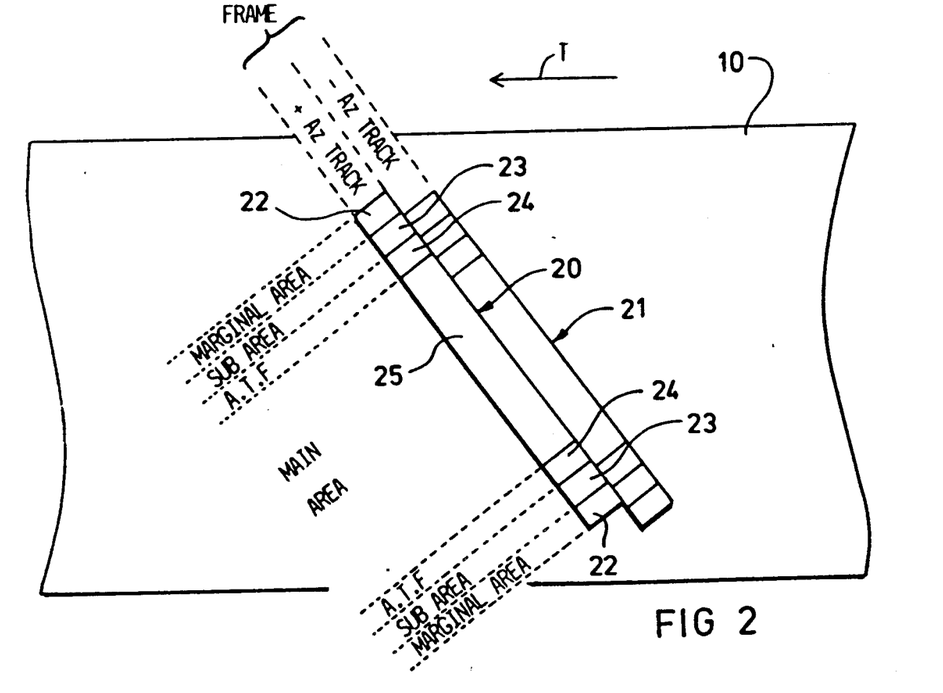
FIG. 2 is a diagrammatic representation of two data tracks recorded on tape using helical scanning.

FIG. 1 shows the basic layout of a helical-scan tape deck 11 in which tape 10 from a tape cartridge 17 passes at a predetermined angle across a rotary head drum 12 with a wrap angle of 90°. In operation, the tape 10 is moved in the direction indicated by arrow T from a supply reel 13 to a take-up reel 14 by rotation of a capstan 15 against which the tape is pressed by a pinch roller 16; at the same time, the head drum is rotated in the sense indicated by arrow R. The head drum 12 houses two read/write heads HA, HB angularly spaced by 180°. In known manner, these heads HA, HB are arranged to write overlapping oblique tracks 20,21 respectively across the tape 10 as shown in FIG. 2. The track written by head HA has a positive azimuth while that written by head HB has a negative azimuth. Each pair of positive and negative azimuth tracks, 20, 21 constitutes a frame.

The basic format of each track as arranged to be written by the present apparatus is illustrated in FIG. 2. Each track comprises two marginal areas 22, two sub areas 23, two ATF (Automatic Track Following) areas 24, and a main area 25. The ATF areas 24 provide signals enabling the heads HA, HB to accurately follow the tracks in known manner. The main area 25 is used primarily to store the data provided to the apparatus (user data) although certain auxiliary information is also stored in this area; the sub areas 23 are primarily used to store further auxiliary information. The items of auxiliary information stored in the main and sub areas are known as sub codes and relate for example, to the logical organisation of the user data, its mapping onto the tape, certain recording parameters (such as format identity, tape parameters etc.), and tape usage history.

A more detailed description of the main area 25 and sub areas 23 will now be given including details as to block size that are compatible with the aforementioned DAT Conference Standard.

Figure 3:
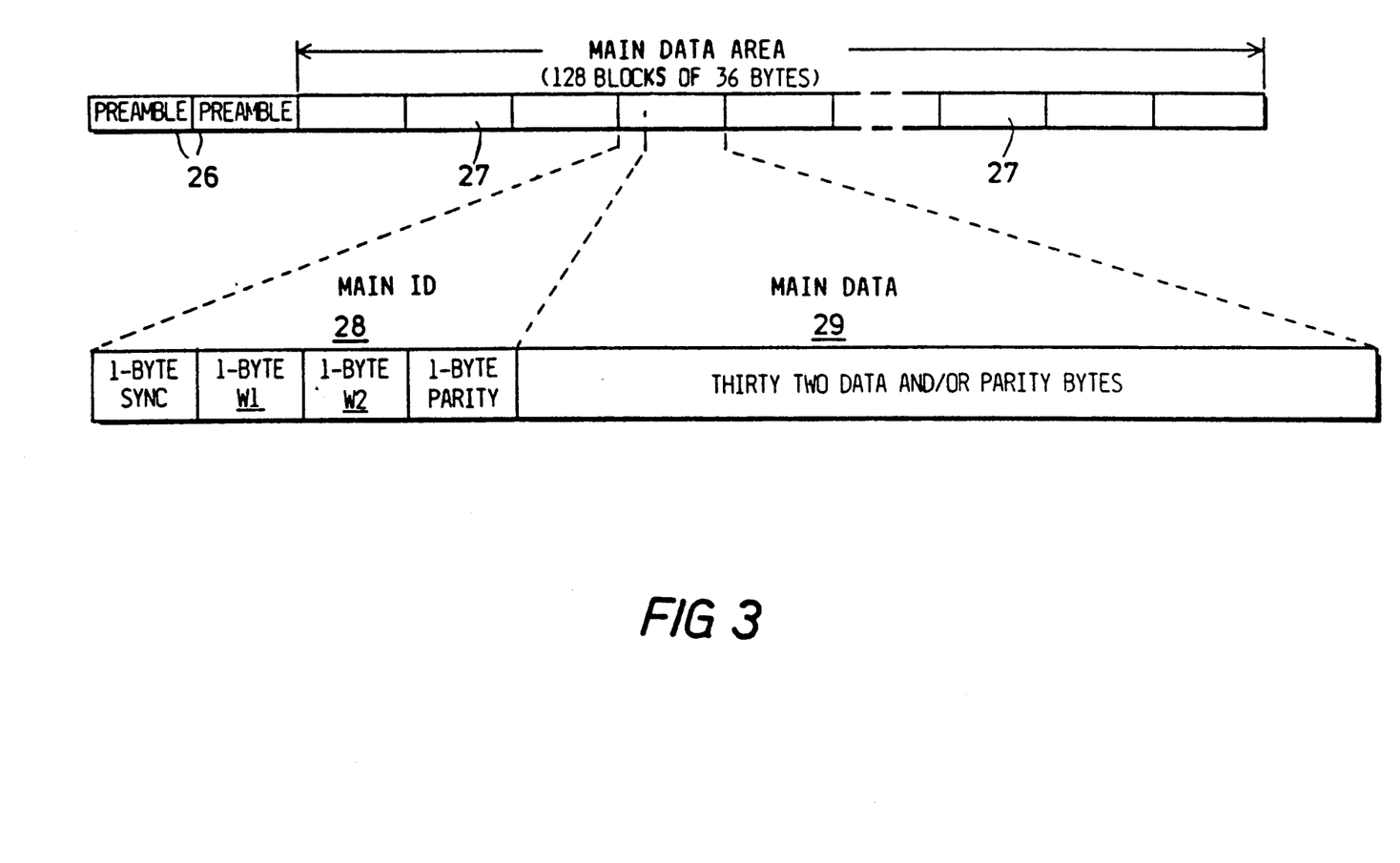
FIG. 3 is a diagrammatic representation of the format of a main data area of a data track.

The data format of the main area 25 of a track is illustrated in FIG. 3. The main area is composed of 130 blocks each thirty six bytes long. The first two blocks 26 are preambles which contain timing data patterns to facilitate timing synchronisation on playback. The remaining 128 blocks 27 make up the 'Main Data Area'. Each block 27 of the Main Data Area comprises a four-byte 'Main ID' region 28 and a thirty-two byte 'Main Data' region 29, the compositions of which are shown in the lower part of FIG. 3.

The Main ID region 28 is composed of a sync byte, two information-containing bytes W1, W2 and a parity byte. Byte W2 is used for storing information relating to the block as a whole (type and address) while byte W1 is used for storing sub codes.

The Main Data region 29 of each block 27 is composed of thirty two bytes generally constituted by user-data and/or user-data parity. However, it is also possible to store sub codes in the Main Data region if desired.

Figure 4:
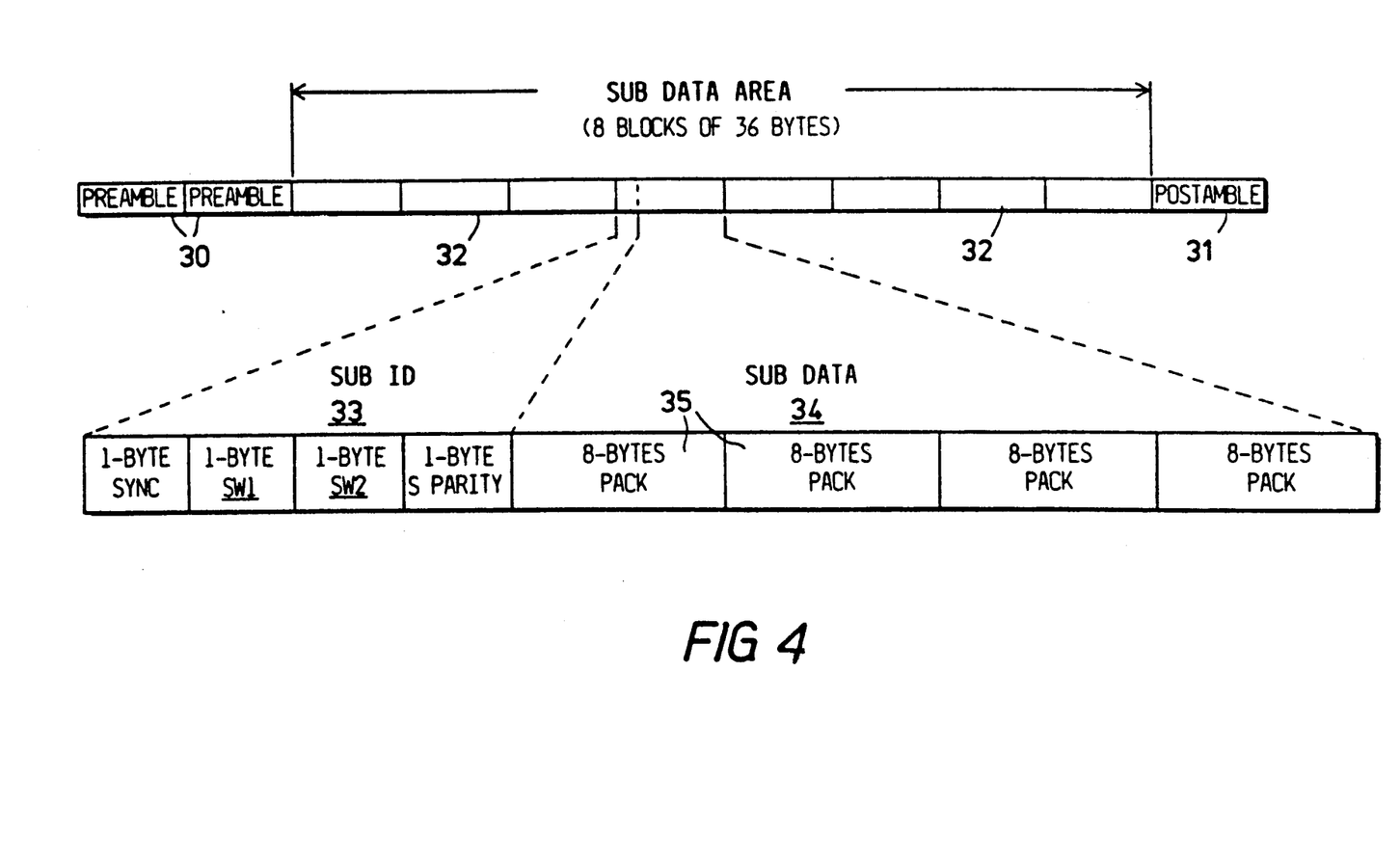
FIG. 4 is a diagrammatic representation of the format of a sub data area of a data track.

The data format of each sub area 23 of a track is illustrated in FIG. 4. The sub area is composed of eleven blocks each thirty-six bytes long. The first two blocks 30 are preambles while the last block 31 is a post-amble. The remaining eight blocks 32 make up the "Sub Data Area". Each block 32 comprises a four-byte 'Sub ID' region 33 and a thirty-two byte 'Sub Data' region 34 the compositions of which are shown in the lower part of FIG. 4.

The Sub ID region 33 is composed of a sync byte, two information-containing bytes SW1, SW2 and a parity byte. Byte SW2 is used for storing information relating to the block as a whole (type and address) and the arrangement of the Sub Data region 34. Byte SW1 is used for storing sub codes.

The Sub Data region 34 of each block 32 is composed of thirty two bytes arranged into four eight-byte "packs" 35. These packs 35 are used for storing sub codes with the types of sub code stored being indicated by a pack-type label that occupies the first half byte of each pack.

In summary, user data is stored in the Main Data regions 29 of the Main Data Area blocks 27 of each track while sub codes can be stored both in the Sub ID and Sub Data regions 33, 34 of Sub Data Area blocks 32 and in the Main ID and Main Data regions 28, 29 of Main Data Area blocks 27.

For the purposes of the present description, two sub codes are of interest, these being a Format ID sub code used to identify the format used to record information, and an absolute frame count sub code used to number each frame from a beginning-of-recording (BOR) position.

The Format ID sub code is a two-bit code stored in byte W1 of the Main ID region 28 of every eighth Main Data Area block 27 in a track, starting with the first such block. Format ID distinguishes between format implementation details rather than major structural differences in format since, of course, these latter features must be common between formats for the storage apparatus to be able to read the Format ID at all. A Format ID of '00' may, for example, identify a format for audio use, with a Format ID of '01' then being used to identify a format for storing computer data.

The absolute frame count sub code is, for example, a three-byte code stored in the third pack 35 of the Sub Data region 34 of every block in the Sub Data Areas of a track.

Before returning to a hardware description of the present apparatus, it will be helpful to consider the general organisation of frames along the tape implemented by the apparatus. Thus, referring to FIG. 5, the tape can be seen to be organised into three main areas, namely a lead-in area 36, a data area 37 and an end-of-data (EOD) area 38. User data is recorded in the frames of the data area 37. In the present apparatus, the frames of the data area are arranged in groups 39 each of a fixed number of frames (for example, twenty two); optionally, these groups are separated from each other by one or more amble frames of predetermined content. The organisation of user data into such groups has no relation to the logical structure of the user data and information relating to this structure (for example, record and file marks) is stored in an index that terminates the user-data in a group (the index actually occupies user data space within the group). Information regarding logical structure may also be stored in sub codes as may other group-dependent items of information.

Figure 5:
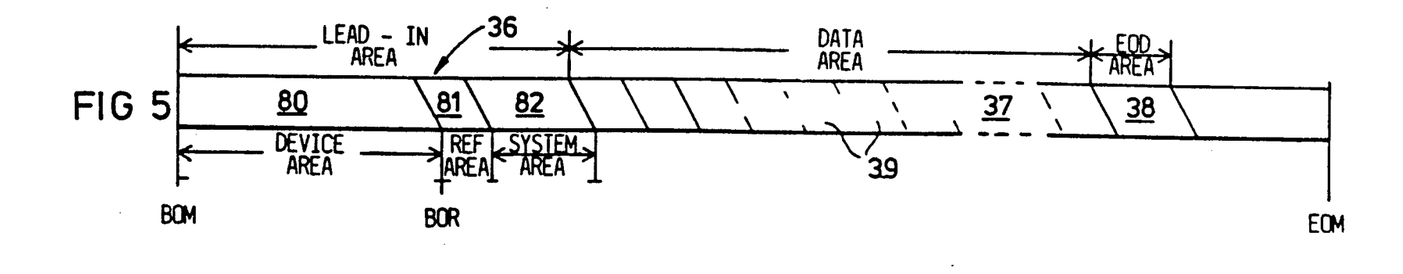
FIG. 5 is a diagram showing the different areas along the length of a recording tape used in the apparatus.

The ends of the tape are referenced in FIG. 5 BOM (for Beginning of Media) and EOM (for End Of Media); these positions may correspond to the ends of the tape media as a whole or to the conjunction of the recording media with leader tape sections. A further tape location BOR is also referenced in FIG. 5, this being a Beginning of Recording position which marks the start of the storage of useful data (the data written immediately after BOR is not user data but, in fact, other data of operational significance).

Figure 6:
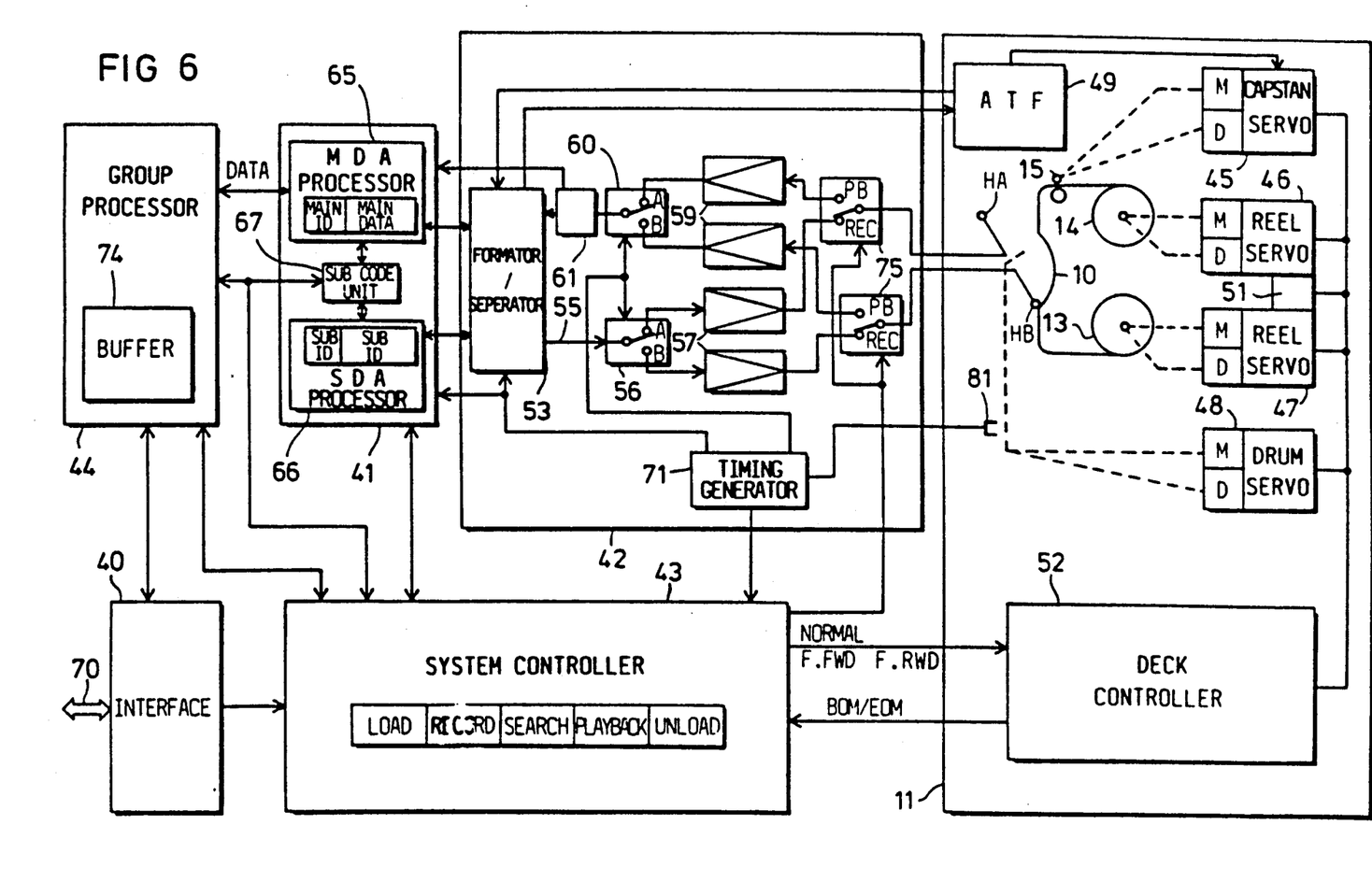
FIG. 6 is a block diagram of the main components of the data storage apparatus.

FIG. 6 is a block diagram of the data storage apparatus in its entirety including the tape deck 11 already described in part with reference to FIG. 1. In addition to the tape deck, the apparatus includes an interface unit 40 for interfacing the apparatus with a computer (not shown); a group processor 44 and a frame data processor 41 for processing user-data and sub codes into and out of Main Data Area and Sub Data Area blocks 27 and 32; a signal organiser 42 for composing/decomposing the signals for writing/reading a track and for appropriately switching the two heads HA, HB; and a system controller 43 for controlling the operation of the apparatus in response to commands received from a computer via the interface unit 40. Each of the main component units of the apparatus will be further described below.

The data storage apparatus is arranged to respond to commands from a computer to load/unload a tape, to store a data record and other logical segmentation marks, to search for a selected record using the segmentation marks, and to read back the next record.

The interface unit 40 is arranged to receive the commands from the computer and to manage the transfer of data records and logical data segmentation marks between the apparatus and computer. Upon receiving a command for the computer, the unit 40 passes it on to the system controller 43 which, in due course will send a response back to the computer via the unit 40 indicating compliance or otherwise with the original command. Once the apparatus has been set up by the system controller 43 in response to a command from the computer to store or read data, then the interface unit 40 will also control the passage of records and segmentation marks between the computer and the group processor 44.

During data storage the group processor 74 is arranged to segment the user-data provided to it in the form of data records into data packages each corresponding to a group's worth of data. This segmentation is effected without regard to the logical organisation of the data (that is, how it is divided into records). Information regarding the logical segmentation of the data (record divisions, file marks) is stored in an index which is generated by the processor 74 and which, as already mentioned, forms the last portion of data making up a group. The processor 44 also generates certain sub codes whose contents are group-dependent or concern the logical segmentation of data. To facilitate these tasks and the transfer of data to and from the processor 44, the latter is provided with a large buffer 74 which is arranged to hold several (for example, three) group's worth of data.

Once a group, including its index, has been assembled, it is transferred a frame at a time to the frame data processor 41. Conceptually there is no need for the frame data processor 41 to be aware of the grouping of frames as the group processor 44 could simply pass it a frame's worth of user data at a time together with the appropriate sub codes. However, in order to speed the transfer of data between the processors 44 and 41, it is advantageous for the frame data processor 41 to be managed in terms of groups for receiving data from the processor 44—in other words, during recording, the processor 41 is told by the group processor 44 when a group is ready for processing after which the processor 41 accesses the frames of the group autonomously from the buffer 74.

As previously mentioned, it may be desirable to insert one or more amble frames between groups of frames recorded on the tape. This can be done by arranging for the frame data processor 41 to generate such amble frames either upon instruction from the group processor 44 or automatically at the end of a group if the processor 41 is aware of group structure.

When data is being read from tape, the group processor 44 is arranged to receive user-data on a frame-by-frame basis, the data being written into the buffer 74 in such a manner as to build up a group. The group processor 44 can then access the group index to recover information on the logical organisation (record structure, file marks) of the user-data in the group. Using this information the group processor can pass the requested record or segmentation mark to the computer via the interface unit 40.

To facilitate the assembly of frame data back into a group's worth of data, each frame can be tagged with an in-group sequence number when the frame is written to tape. This in-group number can be provided as a sub code that, for example, is included at the head of the main data region of the first block in the Main Data Area of each track of a frame. The subcode is used on playback to determine where the related frame data is placed in the buffer 74 when passed to the group processor 44.

The frame data processor 41 functionally comprises a Main-Data-Area (MDA) processor 65 a Sub-Data-Area (SDA)processor 66, and a sub code unit 67 (in practice, these functional elements may be constituted by a single microprocessor running appropriate processes).

The sub code unit 67 is arranged to provide subcodes to the processors 65 and 66 as required during recording and to receive and distribute sub codes from the processors 65, 66 during playback. Dependent on their information contents, sub codes may be generated/required by the group processor 44 or the system controller. In the case of non-varying sub codes such as certain recording parameters, including the aforementioned Format ID, the sub codes may be permanently stored in the unit 67. Furthermore, frame-dependent sub codes such as absolute frame number, may conveniently be generated by the sub code unit 67 itself, the latter including a counter which is incremented for each frame newly written.

The MDA processor 65 is arranged to process a frame's worth of user data at a time together with any relevant sub codes. Thus during recording, the processor 65 receives a frame's worth of user-data from the group processor 44 together with sub codes from the unit 67. On receiving the user-data the processor 65 interleaves the data, and calculates error correcting codes, before assembling the resultant data and sub codes to output the Main-Data-Area blocks for the two tracks making up a frame. In fact before assembling the user data with the sub codes, scrambling (randomising) of the data may be effected to ensure a consistent RF envelope independent of the data contents of a track signal.

During playback, the processor 65 effects a reverse process on the two sets of Main-Data-Area blocks associated with the same frame. Unscrambled, error-corrected and de-interleaved user data is passed to the group processor 44 and sub codes are separated off and distributed by the unit 67 to the processor 44 or system controller 43 as required.

The operation of the SDA processor 66 is similar to the processor 65 except that it operates on the sub codes associated with the sub-data-areas of a track, composing and decomposing these sub codes into and from Sub-Data-Area blocks.

The signal organiser 42 comprises a formatter/-separator unit 53 which during recording (data writing) is arranged to assemble Main-Data-Area blocks and Sub-Data-Area blocks provided by the frame data processor 41 together with ATF signals from an ATF circuit 49, to form the signal to be recorded on each successive track. The necessary pre-amble and post-amble patterns are also inserted into the track signals where necessary by the unit 53. Timing signals for coordinating the operation of the unit 53 with rotation of the heads HA, HB are provided by a timing generator 54 fed with the output of a pulse generator 50 responsive to head drum rotation. The track signals output on line 55 from the unit 53 are passed alternately to head HA and head HB via a head switch 56, respective head drive amplifiers 57, and record/playback switches 58 set to their record positions. The head switch 56 is operated by appropriate timed signals from the timing generator 54.

During playback (data reading) the track signals alternately generated by the heads HA and HB are fed via the record/playback switches 58 (now set in their playback positions), respective read amplifiers 59, a second head switch 60, and a clock recovery circuit 61, to the input of the formatter/separator unit 53. The operation of the head switch 60 is controlled in the same manner as that of the head switch 56. The unit 53 now serves to separate off the ATF signals and feed them to the circuit 49, and to pass the Main-Data-Area blocks and Sub-Data-Area blocks to the frame data processor 41. Clock signals are also passed to the processor 41 from the clock recovery circuit 61.

The switches 58 are controlled by the system controller 43.

The tape deck 11 comprises four servos, namely a capstan servo 45 for controlling the rotation of the capstan 15, first and second reel servos 46, 47 for controlling rotation of the reels 14, 15 respectively, and a drum servo 48 for controlling the rotation of the head drum 12. Each servo includes a motor M and a rotation detector D both coupled to the element controlled by the servo. Associated with the reel servos 46, 47 are means 51 for sensing the beginning-of-media (BOM) and end-of-media (EOM); these means 51 may for example be based on motor current sehsing, as the motor current of whichever reel is being driven to wind in tape (dependant on the direction of tape travel) will increase significantly upon stalling of the motor at BOM/EOM.

The tape deck 11 further comprises the automatic track following circuit 49 for generating ATF signals for recordal on tape during recording of data. During playback, the ATF circuit 49 is responsive to the ATF track signal read from tape to provide an adjustment signal to the capstan servo 45 such that the heads HA, HB are properly aligned with the tracks recorded on the tape. The tape deck 11 also includes the pulse generator 50 for generating timing pulses synchronised to the rotation of the heads HA, HB.

The operation of the tape deck 11 is controlled by a deck controller 52 which is connected to the servos 45 to 48 and to the BOM/EOM sensing means 51. The controller 52 is operable to cause the servos to advance the tape, (either at normal speed or at high speed) through any required distance. This control is effected either by energising the servos for a time interval appropriate to the tape speed set, or by feedback of tape displacement information from one or more of the rotation detectors D associated with the servos.

The deck controller (52) is itself governed by control signals issued by the system controller 43. The deck controller 52 is arranged to output to the controller 43 signals indicative of BOM and EOM being reached.

The system controller 43 serves both to manage high-level interaction between the computer and storage apparatus and to coordinate the functioning of the other units of the storage apparatus in carrying out the basic operations of Load/Record/Search/Playback/Unload requested by the computer. In this latter respect, the controller 43 serves to coordinate the operation of the deck 11 with the data processing portion of the apparatus.

In controlling the tape deck 11, the system controller can request the deck controller 52 to move the tape at the normal read/write speed (Normal) or to move the tape forwards or backwards at high speed, that is, Fast Forward (F.FWD) or Fast Rewind (F.RWD). The deck controller 52 is arranged to report arrival of BOM or EOM back to the system controller 43.

For the purposes of the present description, the operation of primary interest is the Load operation during which a newly-inserted tape cartridge (either blank or previously written to) is set up ready to be written to or read from. For convenience the phase of cartridge insert and the associated checks will be assumed to have been successfully completed and will therefore not be described.

In order to understand the Load operation, it is necessary to describe in more detail the format of the lead-in area 36 of a tape (see FIG. 5).

The lead-in area 36 is made up of a device area 80, a reference area 81 and a system area 82. The device area 80 extends between BOM and BOR and has a length L; this area is not used for the permanent storage of data. The data recording area begins at BOR with the reference area. Frames are given an absolute frame number starting with the frame written at BOR; in fact this frame (frame "1") effectively defines the BOR point. As noted earlier, the absolute frame count is recorded in each frame as a sub code stored, for example, in the third pack of the Sub Data region of every block in the Sub Data Areas of the two tracks of a frame.

The system area is used for storing data regarding tape usage and is updated whenever a tape is to be unloaded (or at such other more frequent intervals as may be required).

The reference area, which is written when loading a blank tape or a tape to be overwritten, serves as a reference point when updating the system area by enabling the apparatus to identify its location on the tape in relation to the system area. Location is established by reading the absolute frame counts of frames in the reference area.

Figures 7A, 7B:
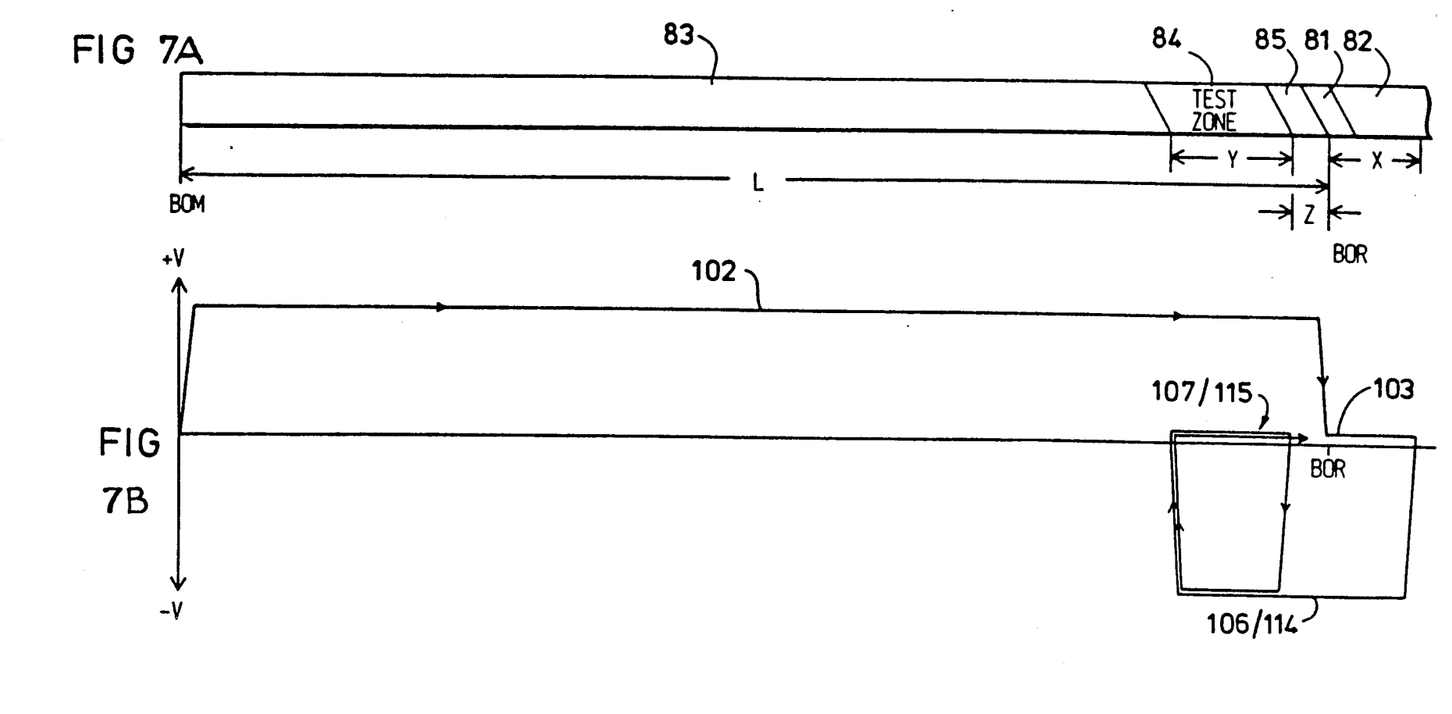
FIG. 7A—is an expanded view of the device area of the tape shown in FIG. 5.
FIG. 7B—is a velocity/displacement diagram illustrating positioning of a test area of the tape opposite read/write heads of the deck during a load phase of the apparatus.

FIG. 7A shows the layout of the device area 80 of the tape in greater detail. The device area has a length L and comprises a loading/unloading zone 83, a test zone 84, and a guard zone 85. The loading/unloading zone 83 is not used at all for writing or reading as it is this section of tape which is wrapped around the drum when a cartridge is loaded and which is therefore vulnerable to wear as the head drum is spun up to speed. Because of this risk of wear, the tape cartridge is only loaded and unloaded at this zone 83. Furthermore, the tape media itself is often clamped to the take up reel by a clamping arrangement that can cause identations in the tape. These indentations are more serious nearer the beginning of the tape and the length of the loading/unloading zone should therefore be chosen to avoid the writing of data over such indentations.

The test zone 84 is used for read and write tests for the processing electronics and servos of the apparatus. The test zone has a length of "Y".

The guard zone 85 is provided to ensure that the test zone 84 does not run over onto the area of the tape used for storing valid data (that is, BOR and beyond). The guard zone has a length of Z.

The distances L, Y and Z are all nominal as they depend on the displacement accuracy of the deck's servos.

For a tape cartridge of the form specified by the DAT Conference Standard L, Y and Z have values of, for example, 350 mm, 40 mm and 10 mm.

Figure 8:
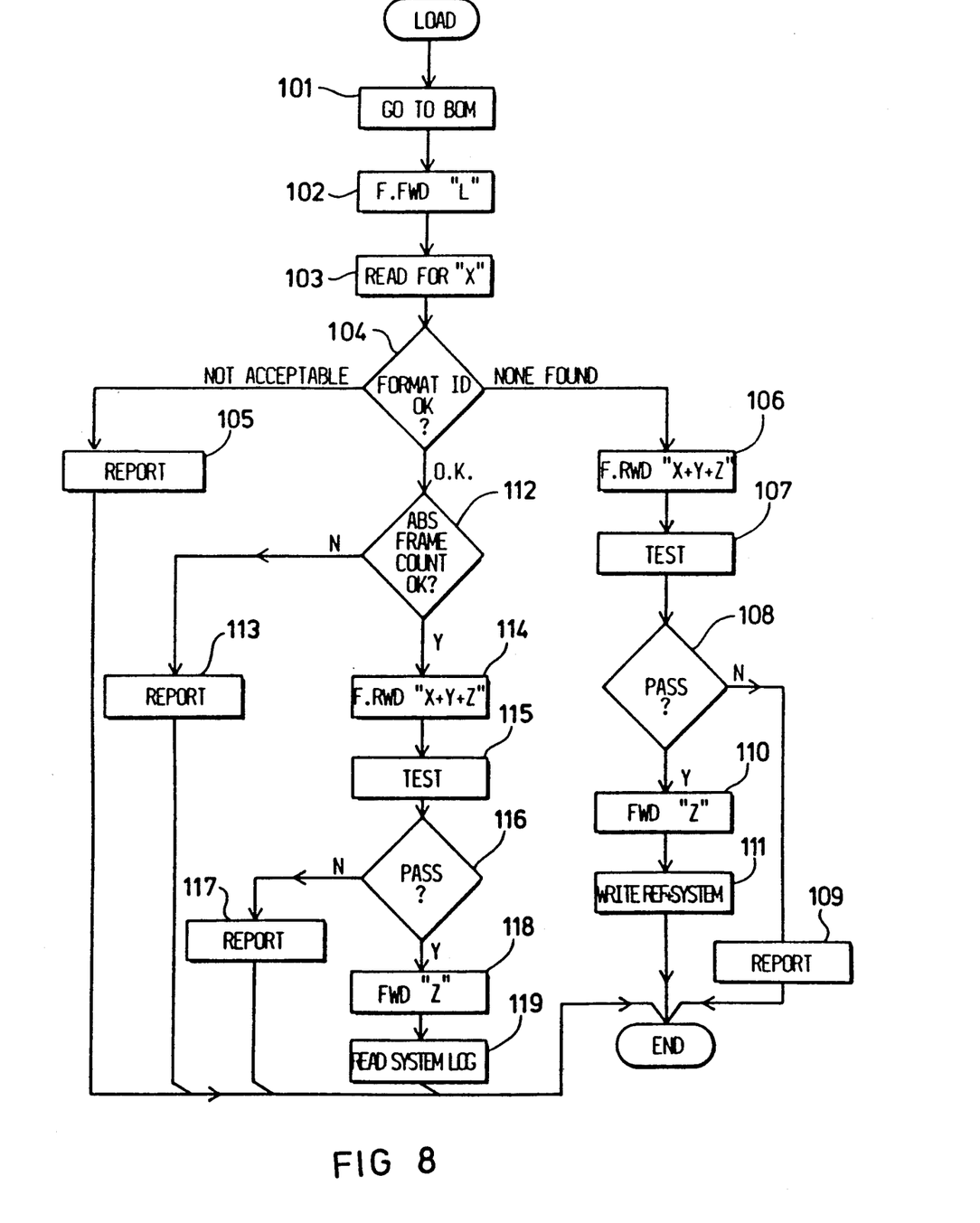
FIG. 8 is a flow chart of the load phase operation.

A load operation will now be described with reference to FIGS. 7 and 8, the latter being a flow chart of the steps involved in the load operation. For convenience, the same reference numerals used in FIG. 8 to indicate steps relating to the displacement of the tape, have been used in FIG. 7B to indicate the corresponding portions of the velocity/displacement graph for the tape.

Upon a load command being received by the system controller 43 (and assuming, as already mentioned, that a tape cartridge is in place in the deck), the controller 43 instructs the deck 11 to go to BOM (step 101 in FIG. 8); this ensures a common starting position for all subsequent operations. The sensor 51 provides feedback to the controller 43 upon the BOM being attained. Next, the controller 43 instructs the deck to advance the tape through a distance L at high speed (step 102) to bring the tape to a position which within the accuracy limits of the desk's servos corresponds to the nominal position of BOR in a previously written tape. Thus at the end of this step, the tape, if previously written to, should be positioned with the beginning of the reference area opposite the head drum.

The controller 43 next commands the desk 11 to advance the tape at normal reading speed for a distance X (step 103). The controller 43 which has set the switches 58 into their playback positions, now monitors the sub code output from the processor 65 to see if any Format IDs are recognised. The value of the distance X is determined by the following considerations. Assuming that the tape is one previously written in the same format with BOR the same nominal distance from BOM, then in order to ensure that at least one frame is read during step 103, the distance X must be large enough to take account of positioning tolerances in the original writing of BOR and in the high speed positioning at the nominal position of BOR in step 102; these tolerances are cumulative and so if writing of BOR and positioning at BOR both have a tolerance of, for example, ±10 mm, then the distance X must be at least 20 mm. In addition, the ATF circuit requires a number of frames to achieve track alignment and the distance X must therefore be increased by an amount sufficient to include enough frames to ensure track alignment in the worst case situation (for example 30 frames). With X determined in this manner, any readable Format IDs of a suitably formatted tape will be recognised (subject to the proper functioning of the deck within its design limits).

At the end of step 103, the controller 43 makes a decision based on its attempted reading of Format ID. This decision (step 104) has three possible outcomes. Firstly, if a Format ID is recognised but this ID indicates that it is an audio tape), then an appropriate report is generated (step 105) and the load operation terminated. If, however, the tape is a blank tape or has been written in an unreadable Format, the controller proceeds in accordance with the right hand branch from step 104 in FIG. 8. This branch may also be taken if the computer instructs the controller 43 to overwrite the existing tape completely. Finally, the third possible outcome of the decision taken in step 104 is that the Format ID indicates a data tape; in this case, the central branch is taken from step 104 in FIG. 8.

Considering the case where the tape is taken to be new or is to be overwritten, the controller 43 now causes the deck 11 to effect a fast re-wind through a distance of X+Y+Z (step 106). Next, the controller 43 carries out a number of read and write tests on the tape while advancing the tape at normal speed through a distance Y and re-winding this distance one or more times as may be necessary (step 107).

The nature of these tests are not relevant to the present description but will generally involve the insertion of random data into the user-data areas of a frame and checking that the error count is acceptable upon reading back the data. If these read and write tests are failed (step 108) then a report is generated (step 109) and the load operation terminated. However, if the tests are passed, then the tape is moved forward from the end of the test zone through a distance Z corresponding to the guard band width (step 110) so that the tape is nominally at a distance L from BOM. Thereafter, the controller 43 causes the reference area and system area to be written in a single continuous pass at a normal writing speed. The first frame of this newly written reference area constitutes BOR. After having written the reference and system areas, the load operation terminates. For reasons of efficiency writing of the reference and system areas may in practice, be deferred until user-data is ready to be written.

If the Format ID check carried out in step 104 shows that the tape is a data tape and therefore acceptable, the controller 43 proceeds to examine the absolute frame number of the last read frame (step 112) to check for possible out-of-tolerance overshoot by the tape movement servos. Such overshooting is particular dangerous as it could lead to read/write tests being carried out on top of existing user data stored in the tape.

In the present example, the absolute frame count would ideally have a number equal to the number of frames occupying the distance X as step 103 would have started at BOR. In the limit of acceptable overshoot due to the tolerances, the absolute frame count would have a value greater than the ideal one by an amount equal to the number of frames by which step 103 could have started beyond BOR (in the present example, the number of frames in 20 mm). Any higher frame count indicates an error and this is reported (step 113) followed by termination of the load operation.

Assuming that the absolute frame count is within acceptable limits, the controller 43 now causes the tape to fast rewind through a distance of X+Y+Z (step 114) and then proceeds to carry out read and write tests (step 115) in the test zone 84. In fact, it would be possible to adjust the re-wind distance travelled in step 114 to take into account any discrepancy in absolute frame count noted from the ideal value.

If the read and write tests are unsuccessful (step 116) a report is generated (step 117) and the load operation terminated. However, if the tests are successful the tape is moved forward a distance Z (step 118) to the position of BOR and the reference and system areas are read (step 119). The load operation is then terminated.

The foregoing process enables the Format ID to be quickly accessed from the reference area by the high-speed positioning of the tape at the expected location of BOR, the reference area being sufficiently long to take account of positioning tolerances. Furthermore, high speed access to the test zone is facilitated by placing this test zone before BOR and therefore outside the formatted area on the tape so that some margin of positional inaccuracy is acceptable.

In the foregoing description, the absolute frame count subcode is described as being used to detect positional overshoot. The sub code is, however, also useful in other situations where tape position (absolute or relative) and tape movement direction are of interest. It would, of course, be possible to number each track individually rather than each frame, or where frames are numbered, to record the frame number in one track of the frame rather than in both tracks. Furthermore, although in the present example, the frames are numbered in sequence from BOR, where the purpose of the frame/track count to aid operation in, for example, the data area of the tape, a reference position other than BOR can be used, such as the first frame/track of the data area.

Where portions of the tape are over-written, then the sequence numbering could be maintained by reading the sequence number of the last frame/track to be preserved and using this number as the basis for numbering the new frames/tracks.

What is claimed is:

1. A method of storing data on a recording tape, the method comprising:

writing data-to-be-stored downstream from a beginning-of-recording position (BOR) the location of which along the tape is determined in terms of displacement of the tape from a fully-rewound beginning-of-media position (BOM);

using a section of tape in a test phase that is upstream of BOR and its expected location to carry out read and/or write tests, this test section of tape being spaced from BOM and being accessed by displacement of the tape through a predetermined distance from BOM and a point on the tape where the position relative to BOM is known.

2. A method according to claim 1, wherein said test section is spaced by a guard band from BOR.

3. A method according to claim 1, wherein access to said test section is effected, at least in part, at high speed.

4. A method according to claim 1, wherein access to said test section is affected by tape positioning means and wherein prior to carrying out said tests a check is made on the positioning means for positional overshoot.

5. A method according to claim 4, wherein said check involves moving the tape from BOM to the region of BOR based on affecting a predetermined displacement by said positioning means, and determining any unacceptable overshoot by reading the tape for data written beyond BOR.

6. A method according to claim 5 applicable to a helical-scan recording method in which data is written in-oblique tracks extending across the tape, wherein BOR is constituted by the first track of a plurality of numbered tracks, whereby tape position relative to BOR, and thus possible overshoot, can be determined by reading the track number of a track.

7. A method according to claim 1, wherein starting from BOM, positioning of the tape for said test phase includes the steps of:

advancing the tape at high speed to a location approximating to the expected location of BOR, reading the tape to check for displacement overshoot in a tape previously written to, and in the absence of overshoot detection, backspacing the tape at high speed to position the tape between BOM and the expected location of BOR;

the tape thereafter being advanced a its normal read/write speed for carrying out said read and/or write tests 8. A method according to claim 7, wherein for a blank tape or a tape to be overwritten, after said read and/or write tests have been carried out, the tape is further advanced to provide a guard band such that the actual BOR whereat data writing is initiated approximates its said expected location.

9. A method according to any of claim 1 applied to the recording of data on a DAT-type tape cartridge using a helical scan technique, wherein BOR is predetermined to be between 300–400 mm from BOM.

* * * * *